United States Patent
Hoch

(10) Patent No.: US 9,858,061 B2
(45) Date of Patent: Jan. 2, 2018

(54) TAMPERPROOF INSTALLATION OF BUILDING CONTROL SOFTWARE IN APPROVED RUNTIME ENVIRONMENTS

(71) Applicant: SIEMENS SCHWEIZ AG, Zurich (CH)

(72) Inventor: Peter Hoch, Pentling (DE)

(73) Assignee: Siemens Schweiz AG, Zurich (CH)

( * ) Notice: Subject to any disclaimer, the term of this patent is extended or adjusted under 35 U.S.C. 154(b) by 158 days.

(21) Appl. No.: 14/442,961

(22) PCT Filed: Nov. 13, 2013

(86) PCT No.: PCT/EP2013/073696
§ 371 (c)(1),
(2) Date: May 14, 2015

(87) PCT Pub. No.: WO2014/076116
PCT Pub. Date: May 22, 2014

(65) Prior Publication Data
US 2015/0277887 A1    Oct. 1, 2015

(30) Foreign Application Priority Data
Nov. 14, 2012 (DE) .......... 10 2012 220 767

(51) Int. Cl.
*H04L 9/32* (2006.01)
*G06F 9/445* (2006.01)
(Continued)

(52) U.S. Cl.
CPC .......... *G06F 8/61* (2013.01); *G06F 21/121* (2013.01); *H04L 63/0442* (2013.01);
(Continued)

(58) Field of Classification Search
CPC ..... H04L 29/06; H04L 29/08; H04L 63/0435; H04L 63/0442; H04L 63/061; H04L 67/10; G06F 8/61; G06F 9/445; G06F 21/57
See application file for complete search history.

(56) References Cited

U.S. PATENT DOCUMENTS 6,760,441 B1 * 7/2004 Ellison .......... G06F 21/53
380/44
7,146,645 B1 * 12/2006 Hellsten .......... G06F 8/61
726/22
(Continued)

FOREIGN PATENT DOCUMENTS

CN    102110199 A    6/2011
CN    102195978 A    9/2011
(Continued)

*Primary Examiner* — Jayesh Jhaveri
(74) *Attorney, Agent, or Firm* — Laurence A. Greenberg; Werner H. Stemer; Ralph E. Locher

(57) ABSTRACT

A method installs building control software. The method includes the transmission of an identity of a runtime environment from the runtime environment to a software delivery entity. A file is generated by the software delivery entity, wherein the file contains the transmitted identity and the software to be installed or a hash of the software to be installed. The generated file is signed by the software delivery entity by a key of the software delivery entity. The signed file is transmitted from the software delivery entity to the runtime environment. An installation and/or an authorization of the software to be installed in the runtime environment are performed, if and only if the identity of the runtime environment corresponds with the identity that has actually been transmitted in the signed file. Devices for installing the building control software are also discussed.

6 Claims, 1 Drawing Sheet

(51) Int. Cl.
  *G06F 21/12* (2013.01)
  *G06F 21/57* (2013.01)
  *H04L 29/06* (2006.01)
  *H04L 29/08* (2006.01)

(52) U.S. Cl.
  CPC ............ *H04L 63/061* (2013.01); *H04L 67/10* (2013.01); *G06F 9/445* (2013.01); *G06F 21/57* (2013.01); *H04L 29/06* (2013.01); *H04L 29/08* (2013.01); *H04L 63/0435* (2013.01)

(56) References Cited

U.S. PATENT DOCUMENTS

| | | |
|---|---|---|
| 7,539,868 B2 | 5/2009 | Balard et al. |
| 8,800,058 B2 * | 8/2014 | Dwivedi ............... G06F 21/105 726/26 |
| 8,984,293 B2 | 3/2015 | Layson et al. |
| 2002/0078380 A1 * | 6/2002 | Lin ......................... G06F 21/10 726/28 |
| 2004/0025036 A1 * | 2/2004 | Balard .................... G06F 21/10 713/189 |
| 2008/0320308 A1 * | 12/2008 | Kostiainen ............ H04L 63/123 713/171 |
| 2009/0222903 A1 * | 9/2009 | Sherkin ............... G06F 21/6218 726/10 |
| 2009/0249492 A1 * | 10/2009 | Boesgaard Sorensen ............. G06F 21/556 726/27 |
| 2012/0131349 A1 * | 5/2012 | Layson ................. G06F 21/121 713/182 |

FOREIGN PATENT DOCUMENTS

| | | |
|---|---|---|
| DE | 10304877 A1 | 8/2004 |
| EP | 1113359 A2 | 7/2001 |
| FI | EP 1113359 A2 * | 7/2001 ............... G06F 8/61 |

* cited by examiner

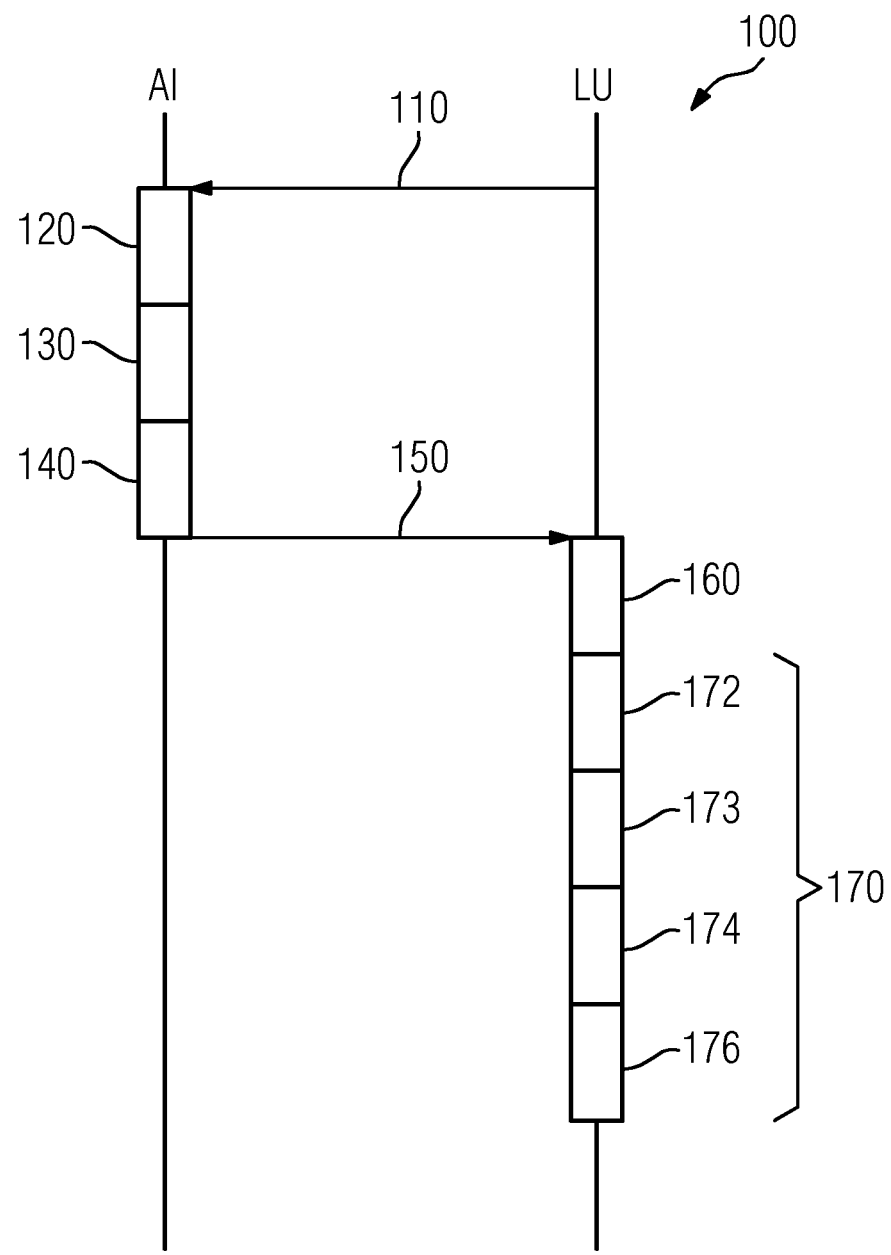

TAMPERPROOF INSTALLATION OF BUILDING CONTROL SOFTWARE IN APPROVED RUNTIME ENVIRONMENTS

CROSS-REFERENCE TO RELATED APPLICATION

This application is a continuation, under 35 U.S.C. §120, of copending international application No. PCT/EP2013/073696, filed Nov. 13, 2013, which designated the United States; this application also claims the priority, under 35 U.S.C. §119, of German patent application No. DE 10 2012 220 767.8, filed Nov. 14, 2012; the prior applications are herewith incorporated by reference in their entirety.

BACKGROUND OF THE INVENTION

Field of the Invention

The invention relates to a method for installing building control software. The method can be used both for initial software installation and for updating software or data by overwriting, replacing or patching.

The invention also relates to a device as a software delivery instance and to a device as a runtime environment. The latter device that is designed to function as a runtime environment can comprise more than one item of equipment. For example, the software to be installed can be installed and/or enabled for subsequent execution on a first item of equipment. A second item of equipment independent thereof can be set up to retrieve the software to be installed from the software delivery instance and/or obtain enablement for already installed software from the software delivery instance and to transfer the software and/or the enablement to the first item of equipment. The first item of equipment can be, for example, a building control system. The second is typically a service PC or a service smartphone.

EP 1 113 359 A2 describes a method for distributing a software application to a particular mobile station. For this purpose a server generates an individual application which cannot be used if it is copied without authorization because it contains an identification code. The individual application only works with the particular mobile station which provides an appropriate identification code which matches the mobile station.

US 2012/131349 A1 describes a system for validating and activating software products. If a user attempts to install a copy of a software product on a user computer, an installation program on the user computer sends an activation request to an activation server.

DE 103 04 877 A1 describes a method for installing a program, wherein a manufacturer identifier of the manufacturer of the program to be installed is interrogated via a user interface. From the device identifier of the device on which the program is to be installed and the manufacturer identifier, a first key is created using an encryption scheme. A second key previously created by the manufacturer and stored on a data medium together with the program to be installed is then compared with the first key generated during installation at the user end. If the two keys tally, transmission of the program to be installed to the device is enabled.

Methods are known in which a building control system regularly contacts a server in order to retrieve updated building control software from the server.

BRIEF SUMMARY OF THE INVENTION

The object of the invention is to provide a method whereby building control software can be downloaded in a tamperproof manner only to, or can be enabled only in, the runtime environment for which it is intended. This can be, for example, a particular runtime environment for which the building control software to be downloaded or enabled has been paid for.

This object is achieved according to the invention in that a method for installing building control software is provided, comprising the following steps:

- transmitting an identity of a runtime environment from the runtime environment to a software delivery instance;
- generating a file by means of the software delivery instance, wherein the file comprises the transmitted identity and software to be installed or a hash of the software to be installed;
- signing the generated file including the transmitted identity and the software to be installed or including the transmitted identity and the hash by the software delivery instance by means of a key of the software delivery instance;
- transmitting the file from the software delivery instance to the runtime environment;
- comparing, by means of the runtime environment, to ascertain whether the identity of the runtime environment tallies with the identity that was actually transmitted in the signed file; and
- installing and/or enabling the software to be installed in the runtime environment if, and only if, the comparison has found that the identity of the runtime environment tallies with the identity that was actually transmitted in the signed file.

In respect of the devices for installing building control software the object is achieved inter alia in that the device is a software delivery instance which is set up to carry out the following steps:

- receiving (110) an identity of a runtime environment (LU) from the runtime environment (LU);
- generating (130) a file, wherein the file comprises the transmitted identity and software to be installed or a hash of the software to be installed;
- signing (140) the generated file including the transmitted identity and the software to be installed or including the transmitted identity and the hash by means of a key of the software delivery instance (AI);
- transmitting (150) the signed file from the software delivery instance (AI) to the runtime environment (LU).

In respect of the devices for installing building control software, the object is also achieved in that the device is a runtime environment (LU) which is set up to carry out the following steps:

- transmitting (110) an identity of the runtime environment (LU) to a software delivery instance (AI);
- receiving (150) a signed file from the software delivery instance (AI), wherein the signed file including the transmitted identity and software to be installed or including the transmitted identity and a hash of the software to be installed is signed;
- comparing (160) whether the identity of the runtime environment (LU) tallies with an identity that was actually transmitted in the signed file; and
- installing (170) and/or enabling the software to be installed in the runtime environment (LU) if, and only if, the comparison (160) has established that the identity of the runtime environment (LU) tallies with the identity that was actually transmitted in the signed file.

The fact that installation and/or enabling of the software to be installed in the runtime environment takes place if, and only if, the comparison has found that the identity of the runtime environment tallies with the identity that was actually transmitted in the signed file ensures that the building control software can only be downloaded to the runtime environment or can only be activated in the runtime environment for which it is intended.

It is expedient if authentication by means of a symmetric- and/or asymmetric-key encryption scheme is used for transmitting the identity of the runtime environment from the runtime environment to the software delivery instance. An encryption scheme enables the trustworthiness of the transmitted identity to be checked end-to-end, i.e. without depending on the trustworthiness of the transmission paths used. The advantage of authentication by means of an asymmetric-key encryption scheme compared to authentication by means of a symmetric-key encryption scheme is that, particularly in the case of a large number of participating runtime environments, key exchange is simplified because the keys for checking the trustworthiness can be administered in a public database and published (e.g. on a generally accessible web page). Said public database has a notary function and must therefore itself be trustworthy.

It is also expedient if encryption by means of a symmetric- and/or asymmetric-key encryption scheme is used for transmitting the identity of the runtime environment from the runtime environment to the software delivery instance. Using an encryption scheme enables interception protection for transmitting the identity to be implemented end-to-end, i.e. without depending on the interception security of the transmission paths used. The advantage of encryption by means of an asymmetric-key encryption scheme compared to encryption by means of a symmetric-key encryption scheme is that, particularly in the case of a large number of participating runtime environments, key exchange is simplified because the keys for the encryption can be made public without affecting interception security.

The method also preferably comprises the following steps: checking the authorization of the runtime environment to cause to-be-installed software to be downloaded, installed or used under the identity that was transmitted to the software delivery instance. This makes it possible to prevent the software from being downloaded by a runtime environment which is not authorized to download said software because of unmet hardware and/or software requirements, because of the absence of an appropriate contractual relationship, because of legal provisions, because of non-payment, because of a risk of misuse and/or for some other reason. In particular, it is preferable if the authorization checking step comprises a credit check and/or a payment procedure. This can ensure that a consideration stipulated for the downloading and/or use of the software to be downloaded is payable before the software is downloaded.

A further development provides that the identity of the runtime environment and the software to be installed are signed separately to produce the signed file or that the identity of the runtime environment and the hash of the software to be installed are signed separately to produce the signed file. This means that the signed identity can be checked in a resource-saving manner without taking into account the signed portions of the software to be installed.

An alternative further development provides that the file containing the identity of the runtime environment and the hash of the software to be installed or containing the identity of the runtime environment and the software to be installed is signed in its entirety by the software delivery instance. This enables improper combining of signed file portions of different transactions to be eliminated.

With particular preference, the identity of the runtime environment is transmitted from the runtime environment to a software delivery instance together with a designation of a desired software version. This enables the software delivery instance to support downloading of runtime-environment-specific and/or process-specific software versions.

It is expedient if the file generated by the software delivery instance comprises a hash of the software to be installed and the following sub-steps are performed in the step of installing and/or enabling the software to be installed: downloading the software to be installed from the software delivery instance to the runtime environment, generating a hash of the downloaded software, comparing the hash of the downloaded software with the hash from the transmitted signed file, and using the downloaded software in the runtime environment if, and only if, the comparison has found that the hash of the downloaded software tallies with the hash that was transmitted in the signed file.

BRIEF DESCRIPTION OF THE DRAWING

The invention will now be explained in greater detail with reference to the accompanying drawings in which:

FIG. 1 shows a message exchange diagram for a software updating method.

The examples described below represent preferred embodiments of the present invention.

DESCRIPTION OF THE INVENTION

The method 100 for installing building control software S as illustrated in FIG. 1 by a message exchange diagram comprises the following steps. In a first step 110, an identity LUi of a runtime environment LU is transmitted in a trustworthy and/or interception-proof manner to a software delivery instance AI. Authentication by means of a symmetric- and/or asymmetric-key encryption scheme can be used for this purpose. The identity LUi can be transmitted from the runtime environment LU to the software delivery instance AI by e-mail, for example (e.g. PGP-encrypted) or via a web page (e.g. using a secure hypertext transmission protocol (such as HTTPS)). Irrespective of the type of transmission method used, it is assumed that the identity LUi of the runtime environment LU is unique and cannot be altered by the user of the runtime environment LU (HTTPS=Hypertext Transfer Protocol Secure). The identity LUi of the runtime environment LU is typically a hardware or software serial number of the runtime environment LU (e.g. the IMEI of a mobile station) (IMEI=International Mobile Station Equipment Identity).

The retrieval of the software S is typically subject to particular requirements such as, for example, the acceptance of terms and conditions or the payment of a purchase price, a usage or an updating charge. In this case it is expedient if the method 100 also comprises the following second step 120: checking 120 that the runtime environment LU is authorized to cause the to-be-installed software S to be downloaded 150, installed 170 or used under the identity LUi that was transmitted to the software delivery instance AI.

In a third step 130, a file D is generated by the software delivery instance AI, said file D comprising the transmitted identity LUi and the software S to be installed and/or a hash H(S) of the software to be installed. In a fourth step 140, the file D generated is signed by the software delivery instance AI by means of a key Kai of the software delivery instance AI. By checking the signature Kai it can be ascertained whether the file D has been changed. In a fifth step 150, the signed file Kai(D) is transmitted from the software delivery instance AI to the runtime environment LU. In a sixth step 160, the runtime environment LU compares whether the identity LUi of the runtime environment LU tallies with the identity LUi' that was actually transmitted in the signed file Kai(D). In a seventh step 170, the to-be-installed software S is installed and/or enabled for use in the runtime environment LU if, and only if, the comparison 160 has found that the identity LUi of the runtime environment LU tallies with the identity LUi' that was actually transmitted in the signed file Kai(D).

According to one embodiment, the identity LUi of the runtime environment LU and the software S to be installed are signed separately to produce the signed file Kai(D), or the identity LUi of the runtime environment LU and the hash H(S) of the software S to be installed are signed separately to produce the signed file D.

According to another embodiment, the signed file D containing the identity LUi of the runtime environment LU and the hash H(S) of the software S to be installed or containing the identity LUi of the runtime environment LU and the software S to be installed is signed in its entirety by the software delivery instance AI.

With particular preference, the identity LUi of the runtime environment LU is transmitted from the runtime environment LU to a software delivery instance AI together with a designation B(V) of a desired software version V.

The following sub-steps are preferably carried out in step 170 of installing and/or enabling the software S to be installed: downloading 172 of the software S to be installed from the software delivery instance AI to the runtime environment LU, generating 173 a hash H(S') of the downloaded software S', comparing 174 the hash H(S') of the downloaded software S' with the hash H(S) from the transmitted signed file Kai(D), and using 176 and/or enabling the downloaded software S' in the runtime environment LU if, and only if, the comparison 174 has found that the hash H(S') of the downloaded software S' tallies with the hash H(S) that was transmitted in the signed file Kai(D).

By means of this method 100 it can be ensured that update software can only be used in a runtime environment LU if the update has been paid for beforehand.

LIST OF REFERENCE CHARACTERS AND ABBREVIATIONS

100 Method for installing software S
110 Transmitting an identity of a runtime environment
120 Checking authorization of the runtime environment LU
130 Generating of a file D by the software delivery instance AI
140 Signing the generated file D
150 Transmitting signed file D to runtime environment LU
160 Comparing identity LUi with identity LUi'
170 Installing the software S to be installed
172 Downloading the software S to be installed
173 Generating a hash H(S) of the downloaded software S
174 Comparing hash H(S) with hash H'(S)
176 Using the downloaded software
AI Software delivery instance
B(V) Designation of the software version V
D File
H(S) Hash of the downloaded software S
H(S') Hash of the downloaded software S'
Kai Key of the software delivery instance AI
Kai(D) Signed file
LU Runtime environment
LUi Identity of the runtime environment LU
LUi' identity of the runtime environment LU that was transmitted in the signed file Kai(D)
S Software
S' Downloaded software
V Software version

The invention claimed is:

1. A method for installing building control software, which comprises the steps of:
    transmitting an identity of a runtime environment from the runtime environment to a software delivery instance;
    generating a file via the software delivery instance, the file containing the transmitted identity and software to be installed, or containing the transmitted identity and a hash of the software to be installed;
    signing, by the software delivery instance, the generated file including the transmitted identity and the software to be installed or including the transmitted identity and the hash, using a key of the software delivery instance, the signing including producing a signed file by performing an operation selected from the group consisting of: separately signing the identity of the runtime environment and the software to be installed and then signing the signed file in its entirety by the software delivery instance, and separately signing the identity of the runtime environment and the hash of the software to be installed and then signing the signed file in its entirety by the software delivery instance;
    transmitting the signed file from the software delivery instance to the runtime environment;
    comparing, via the runtime environment, to ascertain whether the identity of the runtime environment tallies with the identity that was actually transmitted in the signed file; and
    installing and/or enabling the software to be installed in the runtime environment if, and only if, a comparison has found that the identity of the runtime environment tallies with the identity that was actually transmitted in the signed file.

2. The method according to claim 1, which further comprises performing authentication by means of a symmetric-key and/or by means of an asymmetric-key encryption scheme for transmitting the identity of the runtime environment from the runtime environment to the software delivery instance.

3. The method according to claim 1, which further comprises performing encryption by means of a symmetric-key and/or by means of an asymmetric-key encryption scheme for transmitting the identity of the runtime environment from the runtime environment to the software delivery instance.

4. The method according to claim 1, which further comprises checking an authorization of the runtime environment to cause to-be-installed software to be downloaded, installed or used under the identity that was transmitted to the software delivery instance.

5. The method according to claim 1, which further comprises transmitting the identity of the runtime environment from the runtime environment to the software delivery instance together with a designation of a desired software version.

6. The method according to claim 1, wherein the file generated by the software delivery instance contains the hash of the software to be installed and that the following sub-steps are performed in the step of installing and/or enabling the software to be installed:

downloading the software to be installed from the software delivery instance to the runtime environment;

generating a hash of downloaded software;

comparing the hash of the downloaded software with the hash from the transmitted signed file; and using the downloaded software in the runtime environment if, and only if, a comparison has shown that the hash of the downloaded software tallies with the hash that was transmitted in the signed file.

\* \* \* \* \*